(Model.)
F. GRINNELL.
FIRE EXTINGUISHER.
No. 250,913. Patented Dec. 13, 1881.
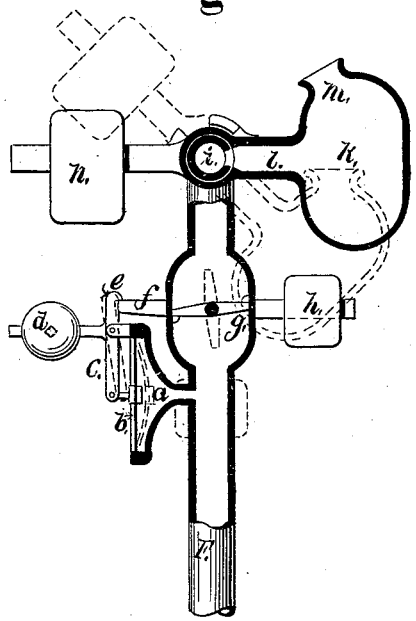
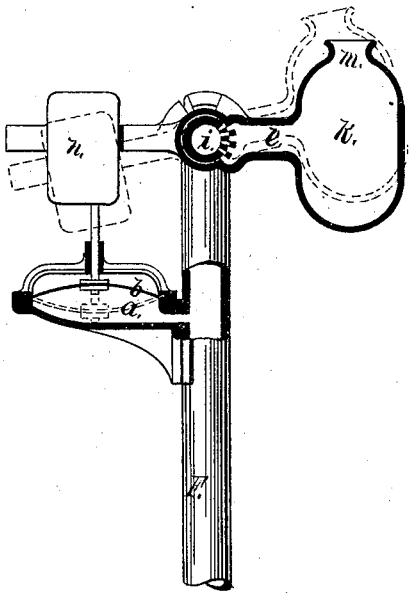
WITNESSES:
Joseph A. Miller Jr.
Wm L. Roy
INVENTOR:
Frederick Grinnell
by Joseph A. Miller
atty

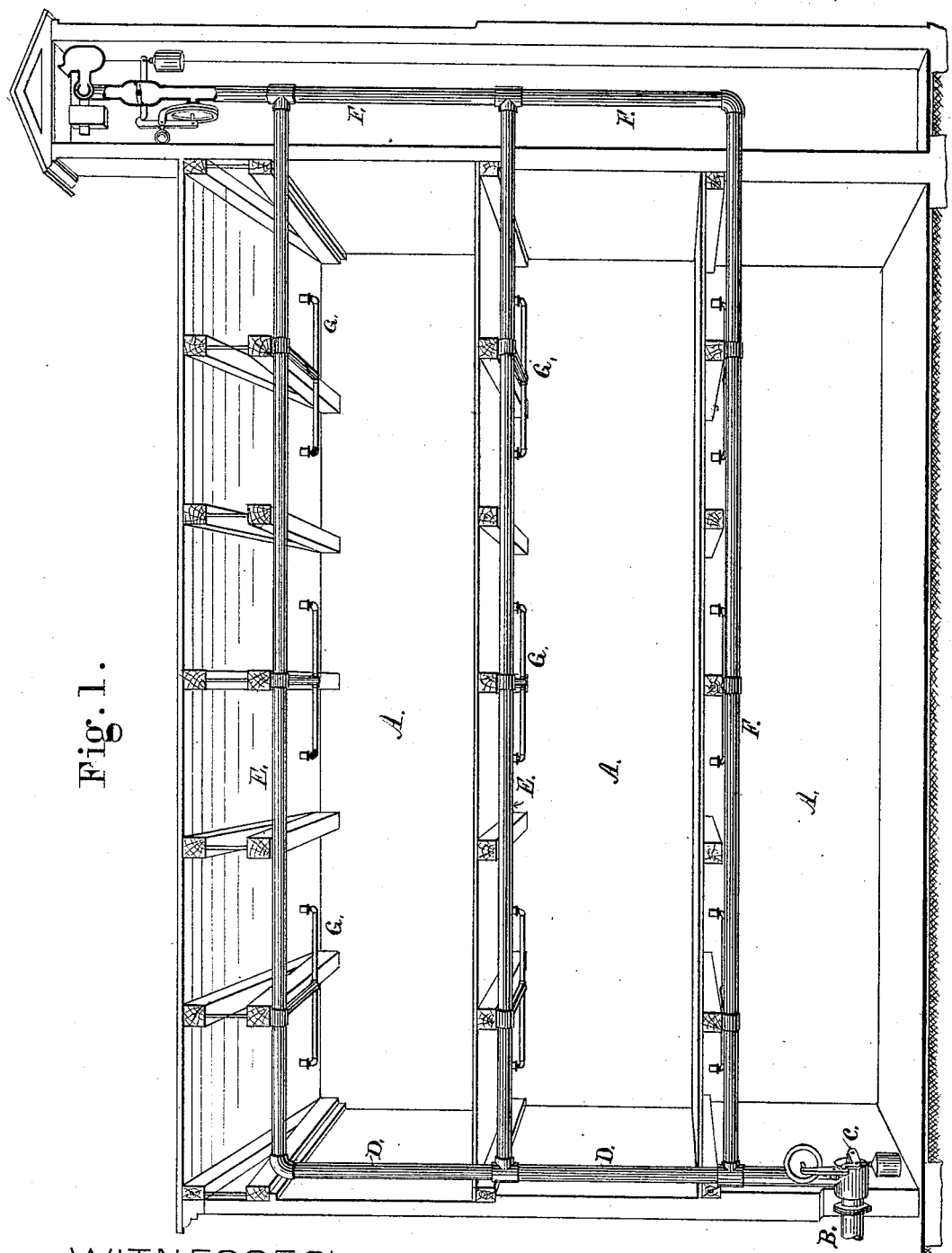

UNITED STATES PATENT OFFICE.

FREDERICK GRINNELL, OF PROVIDENCE, RHODE ISLAND.

FIRE-EXTINGUISHER.

SPECIFICATION forming part of Letters Patent No. 250,913, dated December 13, 1881.

Application filed March 9, 1881. (Model.)

*To all whom it may concern:*

Be it known that I, FREDERICK GRINNELL, of the city and county of Providence, and State of Rhode Island, have invented a new and useful Improvement in Automatic Fire-Extinguishers; and I hereby declare that the following is a full, clear, and exact description of the same, reference being had to the accompanying drawings, forming part of this specification.

This invention has reference to a system of pipes connected with a water-supply and provided with distributers for water or other fire-extinguishing fluids, constructed to be opened automatically when a fire breaks out, so as to protect a building.

The invention consists in the peculiar construction of such a system, so that air under pressure can be maintained in the pipes, and in devices by means of which the air can be quickly discharged, the water turned on, and as soon as the pipes are filled with water the air-outlet closed, all performed automatically as soon as one or more of the distributers are opened, as will be more fully set forth hereinafter.

Figure 1 is a perspective view of the interior of a building provided with a system of automatic fire-extinguishers and devices for operating the same. Figs. 2 and 3 represent devices by means of which the air can be discharged from a system of pipes.

In warehouses or other structures where pipes filled with water are liable to freeze, and also in all places where the water in pipes is liable to cause great loss by reason of leakage, it is desirable to keep the water out of the pipes and to substitute for the same air under pressure.

In an automatic system of fire-extinguishers it is important to give an alarm as soon as any one of the automatic extinguishers is in operation, so that as soon as the fire is extinguished the water may be shut off to prevent unnecessary injury by water. The simplest and most practical means are to maintain a pressure of water or air on the pipes and connect a device or devices operated by the decrease of such pressure, so that in case of any accident to the system the alarm will be given.

In the present improved system air under pressure takes the place of water, and the devices for giving the alarm for opening the water-supply valve and for relieving the pipes of the air, so as to allow the water to freely enter the same, are all constructed so that the reduction of the pressure will release the same and allow them to act by means of a weight or weights.

In the drawings, A A A represent three floors of a building. B is the supply-main; C, the valve controlling the water-supply; D, the rising main with which the horizontal distributing mains E E E connect. F is another rising main, connected with the distributing-mains at the ends opposite main D. G G are the automatic extinguishers.

On the top of the main F is shown a device the office of which is, first, to close the pipe, so that the desired pressure can be maintained in the system; second, to open automatically when the pressure is diminished from any cause, so as to allow the air in the pipes to escape; and, third, to close automatically as soon as the system is filled with water, so as to maintain the full pressure of the water in the system and force it through the distributers near the fire that have been automatically opened, thereby concentrating all the water on the fire.

Referring now to Fig. 2, F is the same main as in Fig. 1. *a* is a chamber communicating with the main F, and provided with a yielding diaphragm, *b*. *c* is a lever, one end of which presses against the diaphragm *b*. This lever is provided with an adjustable weight, *d*, adjusted to counterbalance the pressure on the diaphragm, or nearly so. At the upper end of the lever *c* a hook or notch is provided, in which the end of the arm *f*, which is secured to the spindle of the butterfly-valve *g* and provided with the weight *h*, is secured.

The operation is as follows: As long as the pressure in the pipes is maintained the weight *d* is counterbalanced by the pressure on the diaphragm *b* and the valve is kept closed. As soon, however, as the pressure diminishes the weight *d* overcomes the pressure on the diaphragm and releases the arm *f*. The weight *h* now turns the valve and opens a free passage to the air.

On the upper end of the pipe F a hollow trunnion or arm, *i*, provided with a port, is fixed, and on the same the vessel k, having the hollow arm l and outlet m, is supported, counterbalanced by the weight n. In the normal condition the vessel k is counterbalanced or more than counterbalanced by the weight n and the air-discharge is open. As soon, however, as water enters the vessel k and partly fills the same the vessel will overbalance the weight and close the port, as is shown in broken lines. Suitable stops are arranged to limit the motion of the vessel and allow of overbalancing the same by the weight n.

In Fig. 3 a simpler device is shown. The vessel k, where it is pivotally connected with the hollow arm i, as also this arm, are provided with grated ports. The counterbalance-weight n rests on the diaphragm b, or on a pin projecting from the same; or the diaphragm may be connected with the arm on which the weight n is supported. When the weight is overbalanced by the pressure on the diaphragm b, as shown in solid lines, the ports are closed and the air-pressure can be maintained in the system. As soon as the pressure diminishes the weight n will depress the diaphragm and tilt the vessel, as is shown in broken lines, opening at the same time the ports, to allow of the free discharge of the confined air, and as soon as the air is discharged and water enters the vessel the weight of the water will again close the vessel, thus producing a simple, compact, and automatic device that will perform the three offices required—to close the outlet so as to maintain the air-pressure, open the same to discharge the air, and again close the outlet when the system is in operation to extinguish a fire by forcing water through the pipes.

The supply-valve C is a balance-valve, operated by a weight, which is released by a device similar to the one shown in Fig. 2, by the reduction of pressure in the pipes.

The whole system operates automatically, the extinguishers being arranged so that the heat of a fire will open the same and release the pressure of air in the pipes. A device constructed on the principle shown in Figs. 2 and 3 will allow the air to escape from all the mains, as they, or at least the most of them connected with the rising main F, instead of forcing the air through the extinguishers that may be open, and the opening of the supply-valve will allow the water to quickly reach the open extinguishers and concentrate the whole available effect on the fire.

Having thus described my invention, I claim as new and desire to secure by Letters Patent—

1. In a system for automatically extinguishing fires, the combination, with the supply-main and the rising main, of the main F, connected with the horizontal mains, and provided with a device constructed to automatically open to discharge the air in the pipes and close to prevent the escape of water, as described.

2. The combination, with a system of pipes provided with automatic fire-extinguishers, of a supply-valve constructed to open automatically by the diminution of the air-pressure in the pipes, and a device constructed to automatically open to release the air and close to prevent the escape of water, as described.

3. The combination, with the vessel k and counterbalance-weight n, of the diaphragm b, the whole constructed to close the air-discharge aperture, open the same when the pressure is diminishing, and again close the discharge, substantially as and for the purpose set forth.

In witness whereof I have affixed my name.

FREDERICK GRINNELL.

Witnesses:
J. A. MILLER, Jr.,
WM. L. COOP.